P. J. TABOURIN.
PROCESS AND APPARATUS FOR THE MANUFACTURE OF MOLDED OR CAST ARTICLES
OF CEMENT AND IRON FILAMENTS.
APPLICATION FILED MAR. 21, 1921.

1,433,045.

Patented Oct. 24, 1922.

Inventor
P. J. Tabourin,
By Mark & Clerk
Attys.

Patented Oct. 24, 1922.

1,433,045

UNITED STATES PATENT OFFICE.

PIERRE JULES TABOURIN, OF PARIS, FRANCE.

PROCESS AND APPARATUS FOR THE MANUFACTURE OF MOLDED OR CAST ARTICLES OF CEMENT AND IRON FILAMENTS.

Application filed March 21, 1921. Serial No. 454,162.

(GRANTED UNDER THE PROVISIONS OF THE ACT OF MARCH 3, 1921, 41 STAT. L., 1313.)

*To all whom it may concern:*

Be it known that I, PIERRE JULES TABOURIN, a citizen of the French Republic, residing at No. 45, Rue Laffitte, Paris, France, have invented certain new and useful Improvements in the Processes and Apparatus for the Manufacture of Molded or Cast Articles of Cement and Iron Filaments (for which I have filed applications for patents as follows: France, October 31, 1913, French Patent No. 474,094; Great Britain, April 24, 1918; Belgium, November 7, 1913; Brazil, March 11, 1914; Austria, November 12, 1913; Hungary, November 27, 1913; Russia, November 22, 1913; Argentine, Feb. 18, 1914; Chili, March 2, 1914; Mexico, April 1, 1914; Egypt, March 6, 1914; India, February 24, 1914; Peru, April 13, 1914; Switzerland, April 23, 1914; Roumania, April 30, 1914; Holland, July 10, 1914), of which the following is a specification.

The manufacture of articles molded or cast in cement and iron filaments (in French "paille de fer") offers considerable difficulties owing to the fact that since the iron filaments consist of metal filaments entangled together, it is difficult to cause the cement to penetrate throughout their interstices.

This penetration is effected according to the present invention by agitating during the casting, the mass of iron filaments which has been previously placed in the mould in such a manner that the filaments will move apart and thus allow the cement to pass through.

An apparatus for carrying this process into effect is illustrated by way of example in the accompanying drawing. The apparatus shown is particularly suited for the manufacture of railway sleepers and the mould shown is a mould for a sleeper of this kind.

Figure 1:
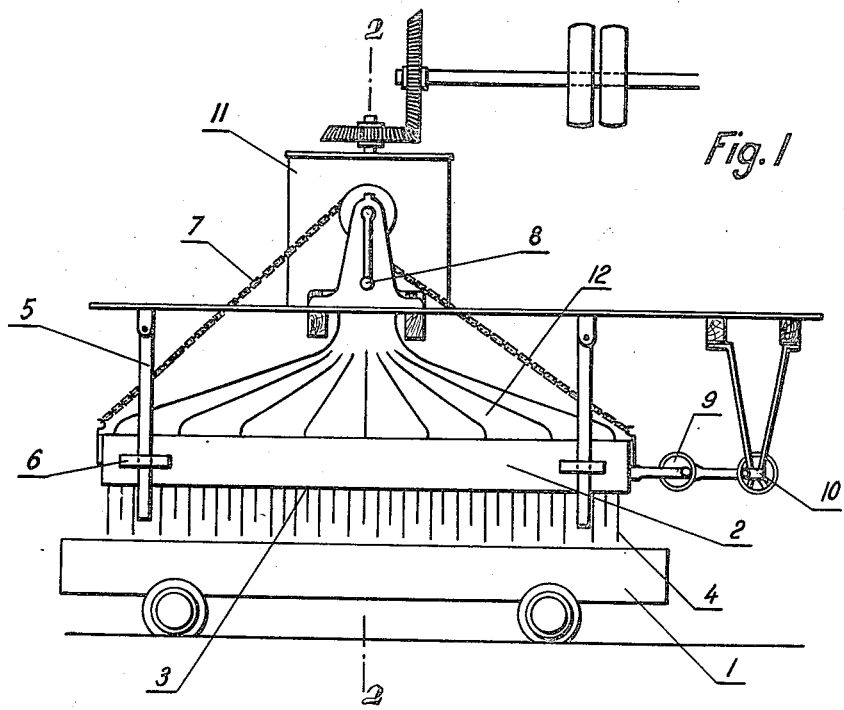
Fig. 1 is a side elevation of the improved apparatus.
Figure 2:
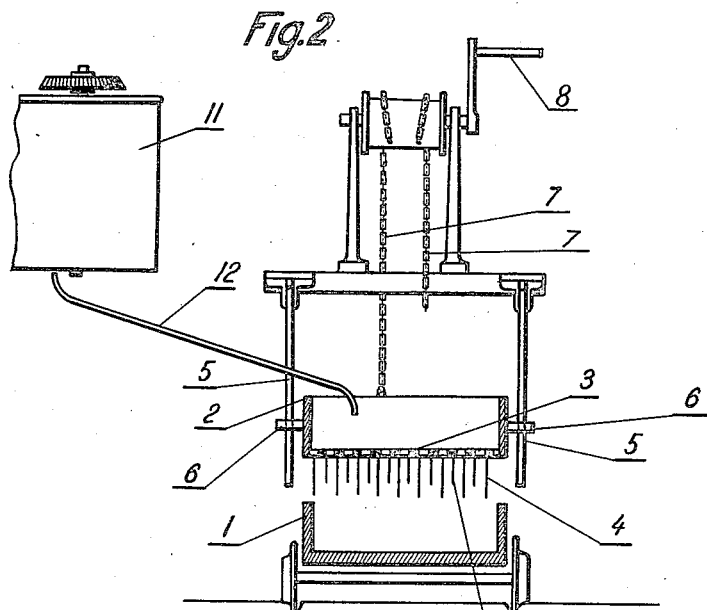
Fig. 2 is a transverse sectional view taken on line 2—2 of Fig. 1, the raising and lowering mechanism being shown in elevation.

The iron bars serving as reinforcement for the sleeper are placed in the mould 1, then the mass or layer of iron filaments is distributed in a uniform manner. For pouring in the cement and for causing it to penetrate in the interstices of the iron filaments, the mould 1 mounted on a carriage is brought beneath a tray 2 forming a counterpart of the mould, that is to say, having approximately the shape of the internal cavity of the mould 1. The bottom of this tray is constituted by a grating 3 having meshes of sufficiently large size to allow the cement to flow through readily. This grating is provided at its lower part with spikes 4 of different lengths and arranged in such a manner as to be adapted to penetrate into the mass of the iron filaments without disturbing the reinforcing bars arranged in the said mould. The tray 2 may be moved vertically along uprights 5 on which it is guided by lugs 6. It is supported by a chain 7 which is actuated by means of a hand crank 8. The uprights 5 are pivotally jointed at their upper points of attachment, and the tray 2 is capable of receiving a to-and-fro movement of small amplitude by means of an eccentric 9 driven by a pulley 10. Above the tray there are arranged a mixing device 11 for making the cement, and a discharger 12 for causing it to flow into the tray.

This discharger consists of an inclined plane widening towards its lower part, and formed on its surface with diverging grooves for the purpose of distributing the cement uniformly over the whole length of the tray 2. When the mould 1 has been brought into position, the tray 2 is lowered so as to cause the spikes 4 to enter the mass of iron filaments. The tray then receives its to-and-fro motion and the cement is poured in.

In this manner the cement readily penetrates through all the interstices of the iron filaments without disturbing in any way the reinforcing bars of the sleeper.

Having now described my invention, what I claim as new and desire to secure by Letters Patent is:—

1. A process for making molded articles of iron filaments and cement consisting in introducing iron filaments into the mould then pouring cement into the mould and simultaneously agitating the iron filaments during the pouring of the cement.

2. The process for making reinforced molded articles of iron filaments and cement consisting in first fixing the reinforcements in the mould then introducing free iron filaments into the mould, then pouring cement into the mold and simultaneously agitating the filaments during the pouring of the cement without being obstructed by the reinforcements.

3. In an apparatus for the manufacture of articles molded or cast of cement and iron filaments, the combination with the mould for receiving the cement and iron filaments, of a tray forming the counterpart of the mould and having a bottom consisting of a grating furnished on its lower part with a plurality of spikes of different lengths adapted to enter the mass of iron filaments, said tray receiving thinly tempered cement, and means for imparting to said tray a horizontal to-and-fro motion during the pouring of the cement into the mould.

In testimony whereof I have signed my name to this specification.

PIERRE JULES TABOURIN.